(12) United States Patent
Okuda

(10) Patent No.: US 8,564,727 B2
(45) Date of Patent: Oct. 22, 2013

(54) REMOTE CONTROL SYSTEM, TELEVISION RECEIVER AND PAIRING METHOD

(75) Inventor: Sachiko Okuda, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/375,593

(22) PCT Filed: Jun. 9, 2010

(86) PCT No.: PCT/JP2010/003844
§ 371 (c)(1),
(2), (4) Date: Dec. 1, 2011

(87) PCT Pub. No.: WO2010/146806
PCT Pub. Date: Dec. 23, 2010

(65) Prior Publication Data
US 2012/0075538 A1    Mar. 29, 2012

(30) Foreign Application Priority Data

Jun. 15, 2009  (JP) .................................. 2009-141825

(51) Int. Cl.
*H04N 5/44* (2011.01)
(52) U.S. Cl.
USPC ........................................................ 348/725
(58) Field of Classification Search
USPC ...................... 348/734, 725, 552, 211, 107.1; 340/5.61, 13.25; 398/106; 725/80, 81
See application file for complete search history.

(56) References Cited

U.S. PATENT DOCUMENTS 6,859,644 B2 * 2/2005 Wang .......................... 455/159.2
7,602,420 B2 * 10/2009 Watanae .................... 348/211.2
8,085,127 B2 * 12/2011 Nakano ........................ 340/5.61
8,203,436 B2 * 6/2012 Ikeda .......................... 340/12.28
8,405,729 B2 * 3/2013 Jain ............................ 348/207.1

(Continued)

FOREIGN PATENT DOCUMENTS

JP    2003-037751    2/2003
JP    2008-263308    10/2008

(Continued)

OTHER PUBLICATIONS

Supplementary European Search Report, issued Oct. 1, 2012 in European application 10 78 9189.7, which is a counterpart to the present application.

(Continued)

*Primary Examiner* — Paulos M Natnael
(74) *Attorney, Agent, or Firm* — Wenderoth, Lind & Ponack, L.L.P.

(57) ABSTRACT

An RF remote control paired with a first device can be paired with a second device connected to the first device via HDMI-CEC by an easy user operation. A pairing method uses a system including a television receiver (1) as the first device, a moving-image playback device (3) as a second device connected to the first device, and a remote control (5) having been paired with the first device. The pairing method includes first to third steps: the first step of transmitting the identification code of the remote control (5) from the first device to the second device, the identification code being registered in the first device; the second step of transmitting a pairing code from the second device to the first device; and the third step of transmitting the pairing code from the first device to the remote control (5).

2 Claims, 5 Drawing Sheets

(56) References Cited

U.S. PATENT DOCUMENTS

| | | | |
|---|---|---|---|
| 8,418,211 B2* | 4/2013 | Beals | 725/81 |
| 2004/0071471 A1* | 4/2004 | Baker et al. | 398/140 |
| 2006/0209892 A1 | 9/2006 | MacMullan et al. | |
| 2007/0256126 A1* | 11/2007 | Erickson et al. | 726/20 |
| 2008/0071429 A1* | 3/2008 | Kraimer et al. | 701/2 |
| 2008/0129445 A1* | 6/2008 | Kraimer et al. | 340/5.2 |
| 2008/0198034 A1* | 8/2008 | Nakano | 340/825.22 |
| 2008/0208627 A1* | 8/2008 | Skyggebjerg | 705/2 |
| 2008/0253772 A1* | 10/2008 | Katsuyama | 398/106 |
| 2009/0079869 A1 | 3/2009 | Kim | |
| 2009/0195407 A1 | 8/2009 | Nakano et al. | |
| 2009/0207319 A1* | 8/2009 | Satoh et al. | 348/734 |
| 2010/0265413 A1* | 10/2010 | Seo | 348/734 |
| 2010/0315279 A1 | 12/2010 | Hamai et al. | |
| 2011/0088067 A1* | 4/2011 | Azuma et al. | 725/58 |
| 2011/0148685 A1* | 6/2011 | Welten | 341/176 |

FOREIGN PATENT DOCUMENTS

| | | |
|---|---|---|
| JP | 2009-027599 | 2/2009 |
| JP | 2009-188539 | 8/2009 |
| WO | 2009/096191 | 8/2009 |

OTHER PUBLICATIONS

International Search Report issued Sep. 14, 2010 in International (PCT) Application No. PCT/JP2010/003844.

* cited by examiner

FIG. 2A

| The ID code of the RF remote control (MAC address) | The version of a remote control code used in the RF remote control | The type of the device corresponded to the RF remote control | ········· |

Remote-control identification code

FIG. 2B

| The ID code of an RF remote control (MAC address) | The ID code of a second device (MAC address) | The PAN-ID of a network whose parent is the second device | A short address of the RF remote control | A short address of the second device | An encryption key | The type of the second device | ········· |

Remote-control pairing code

REMOTE CONTROL SYSTEM, TELEVISION RECEIVER AND PAIRING METHOD

TECHNICAL FIELD

The present invention relates to a remote control system, a television receiver, and a pairing method in which a remote control paired with a first device can be paired with a second device connected to the first device.

BACKGROUND ART

TV broadcasting which converts and transmits high definition image signals (for example, hi-vision image signals) as digital signals has been in service for several years (hereinafter also "digital broadcasting"). This system change has resulted in the popularity of large, flat, high definition screen television receivers (hereinafter, "digital TVs" or simply "TVs").

The system change has also resulted in the popularity of record-and-playback devices and optical disc playback devices. The record-and-playback devices can receive digital broadcasting, and record received signals in optical or magnetic discs to play them back. The optical disc playback devices can play back optical discs in which high definition image signals are recorded as digital signals. The record-and-playback devices and the optical disc playback devices are hereinafter uniformly referred to as "moving-image playback devices".

Digital TVs can display high definition image signals played back by the moving-image playback devices without degradation by using high-definition multimedia interface (HDMI). HDMI is a growing standard for transmitting digital signals between a moving-image playback device and a digital TV.

The HDMI standard has a version with a feature called consumer electronics control (CEC), which enables devices connected via HDMI to exchange control signals. This version is hereinafter referred to as "HDMI-CEC". HDMI-CEC compliant devices can be connected through an HDMI-CEC cable. When connected to each other via HDMI-CEC, devices not only can transmit and receive digital data to/from each other, but also can control each other: one device can control the other device, and vice versa. For example, when the user turns on a TV, the TV can transmit a control signal to a moving-image playback device connected to the TV, thereby turning the moving-image playback device on. As another example, when the user plays back a moving image on a moving-image playback device, moving-image playback device can transmit a control signal to a TV connected to the device. Then, in the TV, an input signal selection switch is selected, allowing the TV to display the moving image outputted from the moving-image playback device.

Infrared rays remote controls (hereinafter, "IR remote controls") are now commonly used with controlled devices such as TVs and moving-image playback devices in order to transmit a control signal to the controlled devices via infrared. In general, each IR remote control in one-to-one correspondence with a controlled device. Therefore, when the user uses a plurality of such devices, the same number of IR remote controls is needed. This requires the user to take the trouble to select and pick up the appropriate IR remote control every time he/she remote controls one of the devices.

To solve this problem, there has been proposed a technique (see, for example, PTL1) in which a first device (for example, TV) includes an infrared transmission device for controlling a second device (for example, moving-image playback device) connected to the first device. The second device is controlled by using an IR remote control which is corresponded to the first device.

Infrared transmission devices are gradually being replaced by radio frequency remote controls (hereinafter, "RF remote controls"), which transmit and receive data to/from controlled devices using high-frequency radio waves (for example, in the 2.4 GHz band).

RF remote controls have the following advantages over IR remote controls.

capable of transmitting larger amounts of data capable of performing bidirectional data communication (RF remote controls not only can transmit data to a controlled device, but also can receive data from the controlled device)

being more resistant to obstructions and blockages (RF remote controls can operate controlled devices regardless of the presence of some obstructions or blockages, whereas IR remote controls cannot if there is an obstruction or blockage)

having less limitations in the direction of use (being less directional) (RF remote controls can operate controlled devices even if not directed to the controlled devices. This is because an RF remote control transmits communication radio waves using an antenna embedded therein, and a controlled device receives the communication radio waves using an antenna embedded therein. An IR remote control, on the other hand, has to be pointed to a controlled device such that the light-emitting device of the IR remote control transmits infrared light to the light receiver of the controlled device)

As described above, RF remote controls are resistant to obstructions and blockage, and not very directional. These features, however, may cause radio waves from an RF remote control to be concurrently received by a plurality of devices. To prevent this malfunction, each RF remote control is corresponded to each controlled device. This is called "pairing" (see, for example, PTL2).

The pairing is generally performed as described from 1 to 5 below. Note that each RF remote control and each controlled device are previously assigned with unique information, which is an identification code (hereinafter, "ID" or "ID code"). The ID code can be, for example, a media access control (MAC) address.

1. An RF remote control transmits to a controlled device a "pairing request code", which requests the execution of a pairing.

2. The controlled device receives the pairing request code, and then transmits its own ID code to the RF remote control.

3. The RF remote control receives the ID code of the controlled device, and then transmits its own ID code to the controlled device.

4. The controlled device receives the ID code of the RF remote control, and then transmits an acknowledge code (hereinafter, "ACK code") to the RF remote control, the ACK code indicating the successful receipt of the ID code of the RF remote control. The controlled device then registers the ID code of the RF remote control as the ID code of the pairing partner.

5. The RF remote control receives the ACK code, and then registers the ID code of the controlled device as the ID code of the pairing partner.

Thus, the RF remote control and the controlled device are corresponded to each other by exchanging and registering their ID codes. After the execution of the pairing, the RF remote control transmits control data containing its own ID code and the ID code of the controlled device to the controlled device. The controlled device receives only control data that contains both its own ID code and the ID code of the RF remote control registered by the pairing, and ignores the other control data. As a result, the controlled device receives only the control data containing its own ID code transmitted from the RF remote control of the pairing partner. This prevents the above-described malfunction where a plurality of devices operate concurrently.

Once paired, the RF remote control and the controlled device are maintained in one-to-one correspondence with each other unless the user erases the ID code registered in the RF remote control or the controlled device (for example, by initialization). Therefore, it is unnecessary to redo a pairing unless the ID code is erased.

As described above, devices connected via HDMI-CEC can control each other. Therefore, it is possible, when a first device is paired with an RF remote control, and is connected to a second device via HDMI-CEC, to remote control the second device by way of the first device using the RF remote control. This allows the user to remote control both first and second devices using one RF remote control, making this system more user-friendly. It takes more time for the user, however, to remote control the second device by way of the first device, than to remote control the second device using an RF remote control paired with the second device.

Alternatively, it is possible to pair the RF remote control paired with the first device further with the second device, allowing the user to remote control both first and second devices using one RF remote control. This, however, requires the user to take the trouble to pair the RF remote control paired with the first device further with the second device.

CITATION LIST

Patent Literature

PTL1
Japanese Patent Unexamined Publication No. 2003-037751
PTL2
Japanese Patent Unexamined Publication No. 2008-263308

SUMMARY OF THE INVENTION

The pairing method of the present invention uses a system including: a first device; a second device connected communicably to the first device; and a remote control having been paired with the first device. The pairing method includes: a first step of transmitting the identification code of the remote control from the first device to the second device, the identification code being registered in the first device; a second step of transmitting a pairing code from the second device to the first device, the pairing code containing an identification code of the second device; and a third step of transmitting the pairing code from the first device to the remote control.

With this structure, when an RF remote control is paired with a first device, and the first device is connected to a second device via HDMI-CEC, the RF remote control and the second device can be paired with each other by an easy user operation.

The television receiver of the present invention includes a display unit; a body control unit; a remote control response unit transmitting and receiving radio waves to and from a remote control having been paired with the television receiver; and a connection unit capable of being connected to another device. The body control unit transmits the identification code of the remote control to a second device connected to the connection unit through the connection unit.

With this structure, when an RF remote control is paired with a television receiver as a first device, and the television receiver is connected to a second device via HDMI-CEC, the RF remote control and the second device can be paired with each other by an easy user operation.

The moving-image playback device of the present invention includes: a moving-image playback unit; a body control unit; a connection unit capable of being connected to an external device; and a remote control response unit transmitting and receiving radio waves to and from a remote control. The body control unit receives the identification code of the remote control paired with a first device from the first device connected to the connection unit through the connection unit; and after the body control unit receives the identification code of the remote control, the remote control response unit generates a pairing code containing the identification code of the moving-image playback device, the identification code being required for a pairing with the remote control, and then transmits the pairing code to one of the first device and the remote control.

With this structure, when an RF remote control is paired with a first device, and the first device is connected to a moving-image playback device via HDMI-CEC, the RF remote control and the moving-image playback device can be paired with each other by an easy user operation.

The remote control system of the present invention includes: a first device; a second device connected communicably to the first device; and a remote control having been paired with the first device. The first device transmits the identification code of the remote control to the second device, the identification code being registered in the first device, after receiving the identification code of the remote control, the second device transmits a pairing code containing the identification code of the second device to the first device; and after receiving the pairing code from the second device, the first device transmits the pairing code to the remote control.

With this structure, when an RF remote control is paired with a first device, and the first device is connected to a second device via HDMI-CEC, the RF remote control and the second device can be paired with each other by an easy user operation.

BRIEF DESCRIPTION OF DRAWINGS

FIG. 2A is a schematic diagram of a remote-control identification code.

FIG. 2B is a schematic diagram of a pairing code.

DESCRIPTION OF EMBODIMENTS

A remote control system according to the present invention will be described as follows with reference to the accompanied drawings.

First Exemplary Embodiment

Figure 1:
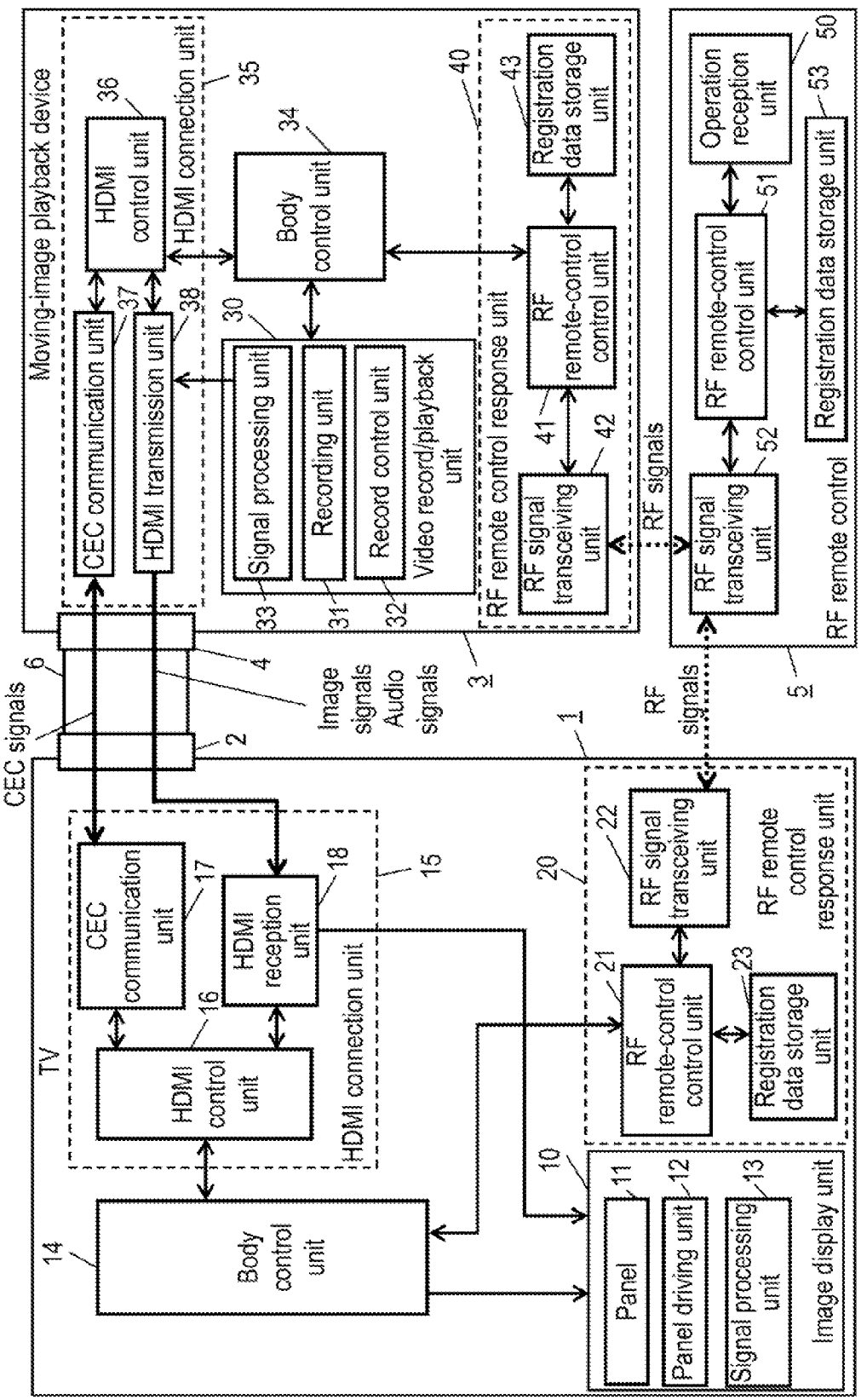
FIG. 1 is a block diagram of a remote control system according to a first exemplary embodiment of the present invention.

FIG. 1 is a block diagram of a remote control system according to a first exemplary embodiment of the present invention. As shown in FIG. 1, the remote control system includes TV 1 as a first device, moving-image playback device 3 as a second device, and RF remote control 5 as a remote control. The structure of the remote control system of the present exemplary embodiment is not limited to the one shown in FIG. 1.

TV 1 includes image display unit 10 as a display unit, body control unit 14, HDMI connection unit 15 as a connection unit, RF remote control response unit 20 as a remote control response unit, HDMI connector 2, and an audio output unit (not shown).

Image display unit 10 includes panel 11, panel driving unit 12, and signal processing unit 13. Signal processing unit 13 processes TV broadcasting signals received by a tuner (not shown) of TV 1 and signals received from moving-image playback device 3 or other devices. Unit 13 processes these signals into image signals to be displayed on panel 11. Panel driving unit 12 drives panel 11 according to an image signal outputted from signal processing unit 13.

Panel 11 is a common product capable of displaying moving images, such as a plasma display panel, a liquid crystal display panel, or an electro luminescence display panel. When driven by panel driving unit 12, panel 11 displays moving images of TV broadcasting received by TV 1, or transmitted from moving-image playback device 3 or another external device.

Body control unit 14 includes a generally-used micro computer (not shown), and a storage unit (not shown) for storing on-screen data (OSD) and various information required to control TV 1. Unit 14 controls each block in TV 1 according to instructions from the user.

HDMI connection unit 15 includes HDMI control unit 16, CEC communication unit 17, and HDMI reception unit 18. HDMI control unit 16, which operates compliant with HDMI-CEC, controls CEC communication unit 17 and HDMI reception unit 18 in cooperation with body control unit 14. This enables TV 1 to be connected to an HDMI-CEC-compliant device through HDMI connector 2.

HDMI reception unit 18 receives HDMI-compliant digital signals such as image signals, audio signals, and other information signals via HDMI connector 2, and then separates them into individual signals. Unit 18 then transmits the separated signals to the appropriate blocks; for example, the image signals to image display unit 10, and the audio signals to the audio output unit.

CEC communication unit 17 transmits and receives HDMI-CEC-compliant control data (CEC signals) to/from another device (for example, moving-image playback device 3) connected to TV 1 via HDMI-CEC.

RF remote control response unit 20 includes RF remote-control control unit 21, RF signal transceiving unit 22, and registration data storage unit 23. RF remote-control control unit 21 performs bidirectional data communication with RF remote control 5, which has already been paired with TV 1. Unit 21 controls RF signal transceiving unit 22 and registration data storage unit 23 in cooperation with body control unit 14.

RF signal transceiving unit 22 has an antenna (not shown) capable of transmitting and receiving radio waves, for example, in the 2.4 GHz band, and transmits and receives data using this antenna. Registration data storage unit 23 includes a storage device (not shown) capable of writing and reading data, such as a semiconductor memory device or a magnetic disc storage device. Unit 23 stores the remote-control identification code and other data of RF remote control 5, which has already been paired with TV 1. FIG. 2A is a schematic diagram of a remote-control identification code, which is a set of a plurality of pieces of data about an RF remote control. The set includes the ID code (for example, MAC address) of the RF remote control; the version of a remote control code used in the RF remote control (namely, a control data set transmitted from the RF remote control to a controlled device); and the type of the device corresponded to the RF remote control. In short, a remote-control identification code is a set of information required when an RF remote control is paired with a controlled device.

Moving-image playback device 3 includes video record/playback unit 30 as a moving-image playback unit, body control unit 34, HDMI connection unit 35 as a connection unit, RF remote control response unit 40 as a remote control response unit, and HDMI connector 4.

Video record/playback unit 30 includes recording unit 31, record control unit 32, and signal processing unit 33. Signal processing unit 33 processes TV broadcasting signals received by a tuner (not shown) of video record/playback unit 30 and signals received from an external device of moving-image playback device 3. Unit 33 processes these signals into signals capable of being recorded in recording unit 31. Signal processing unit 33 further processes signals taken from recording unit 31 and from an optical disc by an optical disc playback unit (not shown). Unit 33 processes these signals into signals to be transmitted to TV 1. Recording unit 31 includes a magnetic disc (not shown) capable of writing and reading data. Unit 31 records TV broadcasting signals received by a tuner (not shown) of moving-image playback device 3 and signals received from an external device of moving-image playback device 3 in a readable format. Record control unit 32 controls recording unit 31 in cooperation with body control unit 34 such that signals can be successfully recorded to and read from recording unit 31.

Body control unit 34 includes a generally-used micro computer (not sho'wn), and a storage unit (not shown) for storing various information required to control moving-image playback device 3. Unit 34 controls each block in moving-image playback device 3 according to instructions from the user.

HDMI connection unit 35, which has a structure similar to that of HDMI connection unit 15, includes HDMI control unit 36, CEC communication unit 37, and HDMI transmission unit 38. HDMI control unit 36, which operates compliant with HDMI-CEC, controls CEC communication unit 37 and HDMI transmission unit 38 in cooperation with body control unit 34. HDMI transmission unit 38 changes image signals, audio signals, and other information signals into HDMI-compliant digital signals, and outputs these signals to an external device (TV 1 in the example shown in FIG. 1) through HDMI connector 4. CEC communication unit 37 transmits and receives HDMI-CEC-compliant control data (CEC signals) to/from another device (TV 1 in the example shown in FIG. 1) connected to moving-image playback device 3 via HDMI-CEC.

RF remote control response unit 40, which has a structure similar to that of RF remote control response unit 20, includes RF remote-control control unit 41. RF signal transceiving unit 42, and registration data storage unit 43. RF remote-control control unit 41 controls RF signal transceiving unit 42 and registration data storage unit 43 in cooperation with body control unit 34. RF remote-control control unit 41 further generates a pairing code required to pair moving-image playback device 3 with RF remote control 5 upon request from body control unit 34. FIG. 2B is a schematic diagram of a pairing code, which is a set of a plurality of pieces of data. The set includes the ID code (for example, MAC address) of an RF remote control; the ID code (for example, MAC address) of a controlled device (in the present exemplary embodiment, moving-image playback device 3 as the second device) for RF remote control 5; the PAN-ID (personal area network ID) of a network whose parent is the controlled device (in the present exemplary embodiment, moving-image playback device 3); a short address of the RF remote control; a short address of the controlled device (in the present exemplary embodiment, moving-image playback device 3), an encryption key, and the type of the controlled device (in the present exemplary embodiment, moving-image playback device 3). In short, a pairing code is a set of information required to pair RF remote control 5 with moving-image playback device 3. PAN is a network used for the communication between personal-use devices. Each PAN is composed of one parent (target) and one or more children (controllers), and is assigned with a unique number, which is the PAN-ID. A short address is the address of each device in the PAN. The parent generates and manages all short addresses.

RF signal transceiving unit 42 has an antenna (not shown) capable of transmitting and receiving radio waves, for example, in the 2.4 GHz band, and transmits and receives data using this antenna. Registration data storage unit 43 includes a storage device (not shown) capable of writing and reading data, such as a semiconductor memory device or a magnetic disc storage device. Unit 43 stores the remote-control identification code and other data of an RF remote control (not shown), which has already been paired with moving-image playback device 3.

RF remote control 5 includes operation reception unit 50, RF remote-control control unit 51, RF signal transceiving unit 52, and registration data storage unit 53.

Similar to generally-used remote controls, operation reception unit 50 includes a plurality of buttons including channel buttons with numbers 0 to 9; channel-change buttons for changing channels ascendingly or descendingly; volume-change buttons; and a power on/off button. In the present exemplary embodiment, RF remote control 5 is paired with a plurality of controlled devices (for example, TV 1 and moving-image playback device 3) as will be described later. Therefore, operation reception unit 50 may include switches (not shown) for selecting one of the controlled devices. Unit 50 generates a signal corresponding to the button and switch selected by the user, and transmits the signal to RF remote-control control unit 51.

According to a user operation received by operation reception unit 50, RF remote-control control unit 51 generates control data containing the ID code of a controlled device (for example, TV 1), which has already been paired with RF remote control 5. Unit 51 then controls RF signal transceiving unit 52 and registration data storage unit 53 so as to perform bidirectional data communication with the controlled device (for example, TV 1). After RF remote control 5 is paired with a plurality of controlled devices, RF remote-control control unit 51 generates control data containing the ID code of the controlled device that is selected by the above-mentioned switches. As a result, the user can specify one of the plurality of devices as a controlled device, and remote control the specified device by using RF remote control 5 paired with these devices.

RF signal transceiving unit 52 has an antenna (not shown) capable of transmitting and receiving radio waves, for example, in the 2.4 GHz band, and transmits and receives data including the above-mentioned control data to/from a controlled device (for example, TV 1) using this antenna. Registration data storage unit 53 includes a storage device (not shown) capable of writing and reading data, such as a semiconductor memory device. Unit 53 stores the ID and other data of the controlled device (for example, TV 1) which has already been paired with RF remote control 5. When RF remote control 5 is paired with a plurality of controlled devices, the ID data of all the paired controlled devices is stored in registration data storage unit 53.

How moving-image playback device 3 and RF remote control 5 are paired with each other in the present exemplary embodiment will be described with reference to a flowchart.

Figure 3:
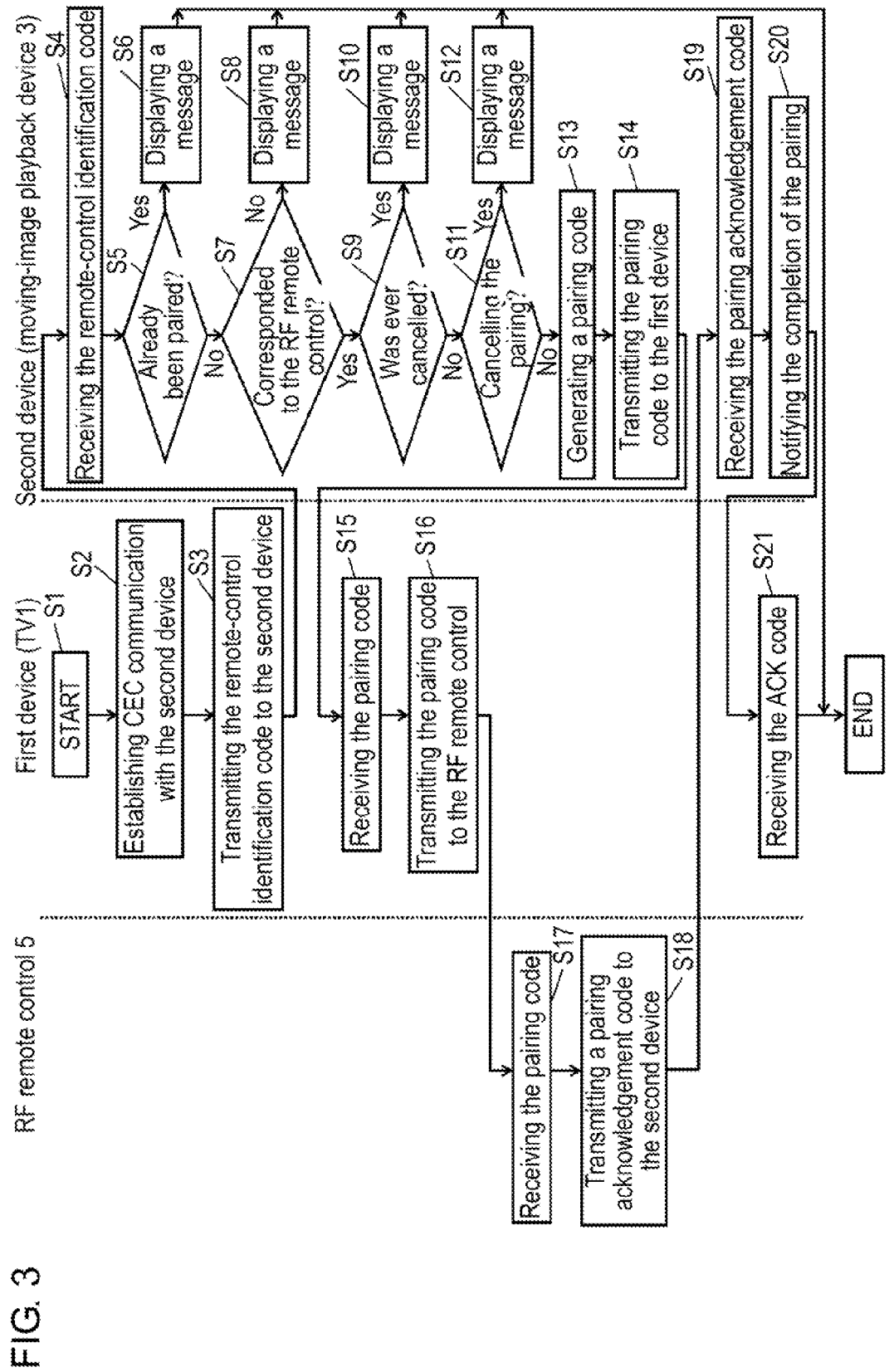
FIG. 3 is a flowchart showing how a moving-image playback device and an RF remote control are paired with each other by way of a TV in the remote control system according to the first exemplary embodiment.

FIG. 3 is a flowchart showing how moving-image playback device 3 and RF remote control 5 are paired with each other by way of TV 1 in the remote control system according to the first exemplary embodiment.

A pairing is started while both TV 1 as the first device and moving-image playback device 3 as the second device are in the ON state (Step S1). TV 1 and moving-image playback device 3 transmit and receive signals to/from each other for confirming that they are both HDMI-CEC-compliant devices, thereby establishing CEC communication (Step S2).

When CEC communication is established, in TV 1, HDMI control unit 16 makes an inquiry to RF remote-control control unit 21 through body control unit 14 about an RF remote control which has already been paired with TV 1. Upon receiving the inquiry, RF remote-control control unit 21 reads the remote-control identification code of RF remote control 5 from registration data storage unit 23, and delivers the code to HDMI control unit 16 through body control unit 14. HDMI control unit 16 transmits the remote-control identification code to moving-image playback device 3 through CEC communication unit 17 as a first step (Step S3).

In moving-image playback device 3, CEC communication unit 37 receives the remote-control identification code from TV 1 via CEC communication, and transfers the code to body control unit 34 through HDMI control unit 36 (Step S4). Body control unit 34 makes an inquiry to RF remote-control control unit 41 whether the remote-control identification code has already been registered in registration data storage unit 43. Thus, moving-image playback device 3 determines whether moving-image playback device 3 has already been paired with RF remote control 5 (Step S5).

Assume that the remote-control identification code received by body control unit 34 is determined to have been registered in registration data storage unit 43, namely that moving-image playback device 3 is determined to have already been paired with RF remote control 5 in Step S5. In this case, body control unit 34 either controls a display unit (not shown) of moving-image playback device 3 to display a message indicating that moving-image playback device 3 has already been paired with RF remote control 5, or transmits a signal to TV 1 so that TV 1 can display the message on image display unit 10 (Step S6), thus bringing the pairing to an end.

Assume, on the other hand, that the remote-control identification code received by body control unit 34 is determined not to have been registered in registration data storage unit 43, namely that moving-image playback device 3 is determined not to have been paired with RF remote control 5 in Step S5. In this case, body control unit 34 decodes the remote-control identification code, thereby determining whether moving-image playback device 3 is corresponded to RF remote control 5 (Step S7).

Assume that moving-image playback device 3 is determined not to be corresponded to RF remote control 5 in Step S7. In this case, body control unit 34 either controls the display unit of moving-image playback device 3 to display a message indicating that moving-image playback device 3 is not corresponded to RF remote control 5, or transmits a signal to TV 1 so that TV 1 can display the message on image display unit 10 (Step S8), thus bringing the pairing to an end.

Assume, on the other hand, that moving-image playback device 3 is determined to be corresponded to RF remote control 5 in Step S7. In this case, body control unit 34 makes an inquiry to RF remote-control control unit 41 whether there is a record that moving-image playback device 3 was ever cancelled from being paired with RF remote control 5. RF remote-control control unit 41 determines whether registration data storage unit 43 contains the record about the past cancellation of the pairing with RF remote control 5 (Step S9).

Assume that the record about the past cancellation of the pairing with RF remote control 5 is confirmed to be present in Step S9. In this case, body control unit 34 either controls the display unit of moving-image playback device 3 to display a message indicating that moving-image playback device 3 is not going to be paired with RF remote control 5, or transmits a signal to TV 1 so that TV1 can display In the message on image display unit 10 (Step S10), thus bringing the pairing to an end.

Thus, if the user once cancels the pairing between moving-image playback device 3 and RF remote control 5, the operation can automatically be skipped hereafter. This eliminates the need for the user, who does not want to pair moving-image playback device 3 with RF remote control 5, to cancel the pairing every time it is started.

Assume, on the other hand, that the record about the past cancellation of the pairing with RF remote control 5 is not confirmed to be present in Step S9. In this case, body control unit 34 determines whether the user has ever performed a predetermined operation to cancel the pairing (Step S11). The predetermined operation to cancel the pairing can be, for example, pressing a button provided for the user operation on moving-image playback device 3 or operating an RF remote control having been paired with moving-image playback device 3.

If it is confirmed that the user ever performed the predetermined operation to cancel the pairing in Step S11, body control unit 34 controls RF remote-control control unit 41 to record information in registration data storage unit 43, the information indicating that the pairing has been cancelled. Body control unit 34 then either controls the display unit of moving-image playback device 3 to display a message indicating that the pairing with RF remote control 5 has been cancelled, or transmits a signal to TV 1 so that TV 1 can display the message on image display unit 10 (Step S12), thus bringing the pairing to an end.

If it is not confirmed that the user ever performed the predetermined operation to cancel the pairing in Step S11, body control unit 34 demands RF remote-control control unit 41 to provide a pairing code required for the pairing with RF remote control 5. Upon receiving the request, RF remote-control control unit 41 generates a pairing code, and then transmits the code to HDMI control unit 36 through body control unit 34 (Step S13).

HDMI control unit 36 transmits the pairing code to TV 1 through CEC communication unit 37 as a second step (Step S14).

In TV 1, CEC communication unit 17 receives the pairing code from moving-image playback device 3 via CEC communication, and transfers the code to body control unit 14 through HDMI control unit 16 (Step S 15). Body control unit 14 transfers the pairing code to RF remote-control control unit 21. RF remote-control control unit 21 transmits the pairing code to RF remote control 5 through RF signal transceiving unit 22 as a third step (Step S 16).

In RF remote control 5, RF signal transceiving unit 52 receives the pairing code from TV 1, and delivers the code to RF remote-control control unit 51. RF remote-control control unit 51 receives and records the pairing code in registration data storage unit 53 (Step S17). The pairing code contains the ID data of moving-image playback device 3, and, consequently, this ID data is recorded in registration data storage unit 53.

RF remote-control control unit 51 transmits a pairing acknowledgement code to moving-image playback device 3 through RF signal transceiving unit 52 (Step S18). The pairing acknowledgement code indicates successful receipt of the pairing code generated by moving-image playback device 3.

In moving-image playback device 3, RF signal transceiving unit 42 receives the pairing acknowledgement code from RF remote control 5, and delivers the code to RF remote-control control unit 41 (Step S19).

Upon receiving the pairing acknowledgement code, RF remote-control control unit 41 confirms the completion of the pairing with RF remote control 5. Unit 41 then transmits an ACK code indicating the completion of the pairing to TV 1 through body control unit 34, HDMI control unit 36, and CEC communication unit 37 (Step S20). TV 1 receives the ACK code (Step S21), thus bringing the pairing to an end. In this case, TV 1 may display a message on image display unit 10, indicating the completion of the pairing between moving-image playback device 3 and RF remote control 5.

As described hereinbefore, according to the present exemplary embodiment, the first device (in the present exemplary embodiment, TV 1) transmits information about RF remote control 5 paired with the first device via CEC communication to the second device (in the present exemplary embodiment, moving-image playback device 3) connected to the first device via HDMI-CEC. The second device generates a pairing code required for the pairing with RF remote control 5 based on the received code, and transmits the pairing code to RF remote control 5 by way of the first device via CEC communication. This enables RF remote control 5 and the second device to be paired with each other without direct information exchange between them. Thus, it becomes easier for the user to pair RF remote control 5 and the second device than to pair them in response to the above-described user operation.

Second Exemplary Embodiment

In the first exemplary embodiment, RF remote control 5 is paired with another device without receiving a user operation. In the present exemplary embodiment, on the other hand, RF remote control 5 is paired with another device according to a user operation.

Figure 4:
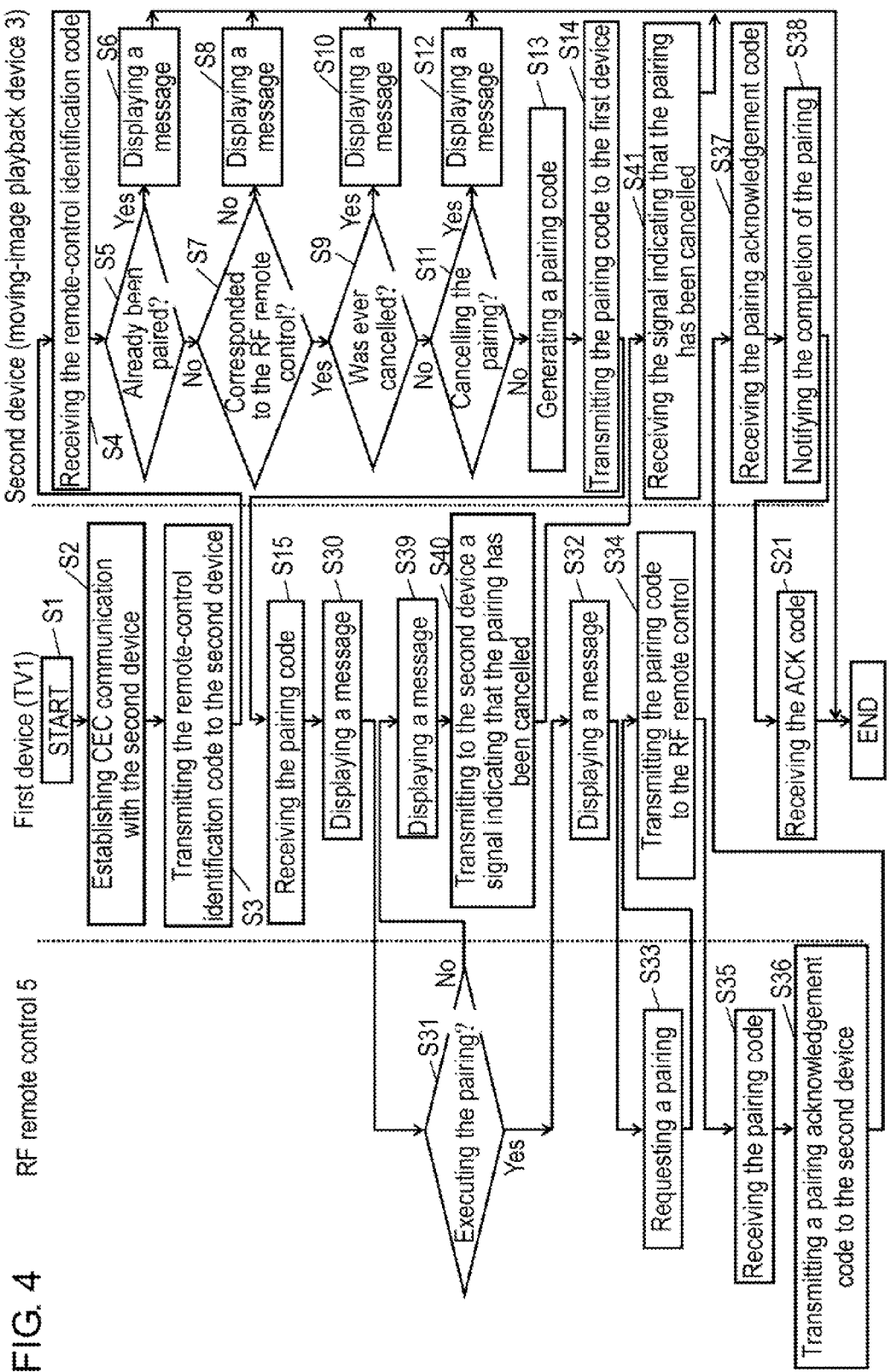
FIG. 4 is a flowchart showing how a moving-image playback device and an RF remote control are paired with each other by way of a TV in a remote control system according to a second exemplary embodiment of the present invention.

FIG. 4 is a flowchart showing how moving-image playback device 3 and RF remote control 5 are paired with each other by way of TV 1 in a remote control system according to the second exemplary embodiment.

The remote control system of the present exemplary embodiment has a structure similar to that of the remote control system of the first exemplary embodiment shown in FIG. 1, and hence the description thereof will be omitted. Steps S1 to S15 in the present exemplary embodiment are identical to those in the first exemplary embodiment, and hence the description thereof will be omitted.

After Step S15, body control unit 14 controls image display unit 10 to display a message asking the user whether or not to execute the pairing between RF remote control 5 and moving-image playback device 3 (Step S30). RF remote control 5 waits for a user operation (Step S31). One specific example of the message is "Press button 1 to perform a pairing or press button 9 not to perform a pairing".

When RF remote control 5 receives a user operation to execute a pairing in Step S31, RF remote-control control unit 51 transmits a signal to this effect to TV 1 through RF signal transceiving unit 52. The signal can be, for example, a signal indicating that button 1 has been pressed or that button 9 has been pressed, and is not a unique signal generated by RF remote control 5 to indicate the execution or cancellation of the pairing.

In TV 1, upon receiving the signal from RF remote control 5, RF signal transceiving unit 22 transfers the signal to body control unit 14 through RF remote-control control unit 21. Body control unit 14 confirms that the received signal indicates the execution of the pairing (in the above example, button 1 in RF remote control 5 has been pressed). Body control unit 14 then controls image display unit 10 to display a message urging the user to perform a predetermined user operation to generate a pairing request code for requesting the execution of the pairing (Step S32). The predetermined user operation is preferably an unusual button operation, such as "Press buttons 1 and 9 of the RF remote control at the same time" or "Press and hold button 1 of the RF remote control for three seconds" in order to prevent wrong operations.

In RF remote control 5, upon receiving the predetermined user operation to generate the pairing request code, RF remote-control control unit 51 generates a signal to this effect, namely a signal containing the pairing request code. Unit 51 then transmits the signal to TV 1 through RF signal transceiving unit 52 (Step S33). The "pairing request code" is a special signal generated only in response to the predetermined user operation to request the execution of a pairing. In the above example, the special signal is generated only when button 1 is pressed and held for three seconds, or when buttons 1 and 9 are pressed at the same time.

In TV 1, upon receiving the signal from RF remote control 5, RF signal transceiving unit 22 transfers the signal to body control unit 14 through RF remote-control control unit 21. Body control unit 14 confirms that the received signal contains the pairing request code (in the above example, the signal is generated only when button 1 is pressed and held for three seconds, or when buttons 1 and 9 are pressed at the same time). Unit 14 then transfers the pairing code received from moving-image playback device 3 to RF remote-control control unit 21. RF remote-control control unit 21 transmits the pairing code to RF remote control 5 through RF signal transceiving unit 22 as the third step (Step S34).

In RF remote control 5, RF signal transceiving unit 52 receives the pairing code from TV 1, and delivers the code to RF remote-control control unit 51. RF remote-control control unit 51 receives and records the pairing code in registration data storage unit 53 (Step S35). The pairing code contains the ID data of moving-image playback device 3, and, consequently, this ID data is recorded in registration data storage unit 53.

RF remote-control control unit 51 transmits a pairing acknowledgement code to moving-image playback device 3 through RF signal transceiving unit 52, the pairing acknowledgement code indicating successful receipt of the pairing code generated by moving-image playback device 3 (Step S36).

In moving-image playback device 3, RF signal transceiving unit 42 receives the pairing acknowledgement code from RF remote control 5, and delivers the code to RF remote-control control unit 41 (Step S37).

Upon receiving the pairing acknowledgement code, RF remote-control control unit 41 confirms the completion of the pairing with RF remote control 5. Unit 41 then transmits an ACK code indicating the completion of the pairing to TV 1 through body control unit 34, HDMI control unit 36, and CEC communication unit 37 via CEC communication (Step S38). TV 1 receives the ACK code (Step S21), thus bringing the pairing to an end. In this case, TV 1 may display a message on image display unit 10, indicating the completion of the pairing between moving-image playback device 3 and RF remote control 5.

When RF remote control 5 receives, on the other hand, a user operation to cancel the pairing in Step S31, RF remote-control control unit 51 transmits a signal to this effect to TV 1 through RF signal transceiving unit 52. In TV 1, upon receiving the signal, RF signal transceiving unit 22 transfers the signal to body control unit 14 through RF remote-control control unit 21. Body control unit 14 confirms that the received signal indicates the user's intention to cancel the pairing (in the above example, button 9 of RF remote control 5 has been pressed). Body control unit 14 then controls image display unit 10 to display a message indicating that the pairing between RF remote control 5 and moving-image playback device 3 has been cancelled (Step S39). Body control unit 14 then transmits, to moving-image playback device 3 through HDMI control unit 16 and CEC communication unit 17, a signal indicating that the pairing has been cancelled (Step S40).

In moving-image playback device 3, CEC communication unit 37 receives, from TV 1 via CEC communication, the signal indicating that the pairing has been cancelled, and transfers the signal to body control unit 34 through HDMI control unit 36. Body control unit 34 confirms that the received signal contains information indicating that the pairing has been cancelled. Unit 34 then controls RF remote-control control unit 41 to record the information in registration data storage unit 43 (Step S41), thus bringing the pairing to an end.

As described hereinbefore, in the present exemplary embodiment, RF remote control 5 receives a user operation in Step S31. Therefore, RF remote control 5 can be in the OFF state until it receives the user operation in Step S31, thus reducing its power consumption. According to the present exemplary embodiment, the user can easily pair RF remote control 5 and the second device, while reducing the power consumption of RF remote control 5.

Third Exemplary Embodiment

In the first and second exemplary embodiments, the pairing code generated by the second device (for example, moving-image playback device 3) is transmitted to RF remote control 5 by way of the first device (for example, TV 1). In the present exemplary embodiment, on the other hand, the pairing code generated by the second device is transmitted directly to RF remote control 5.

Figure 5:
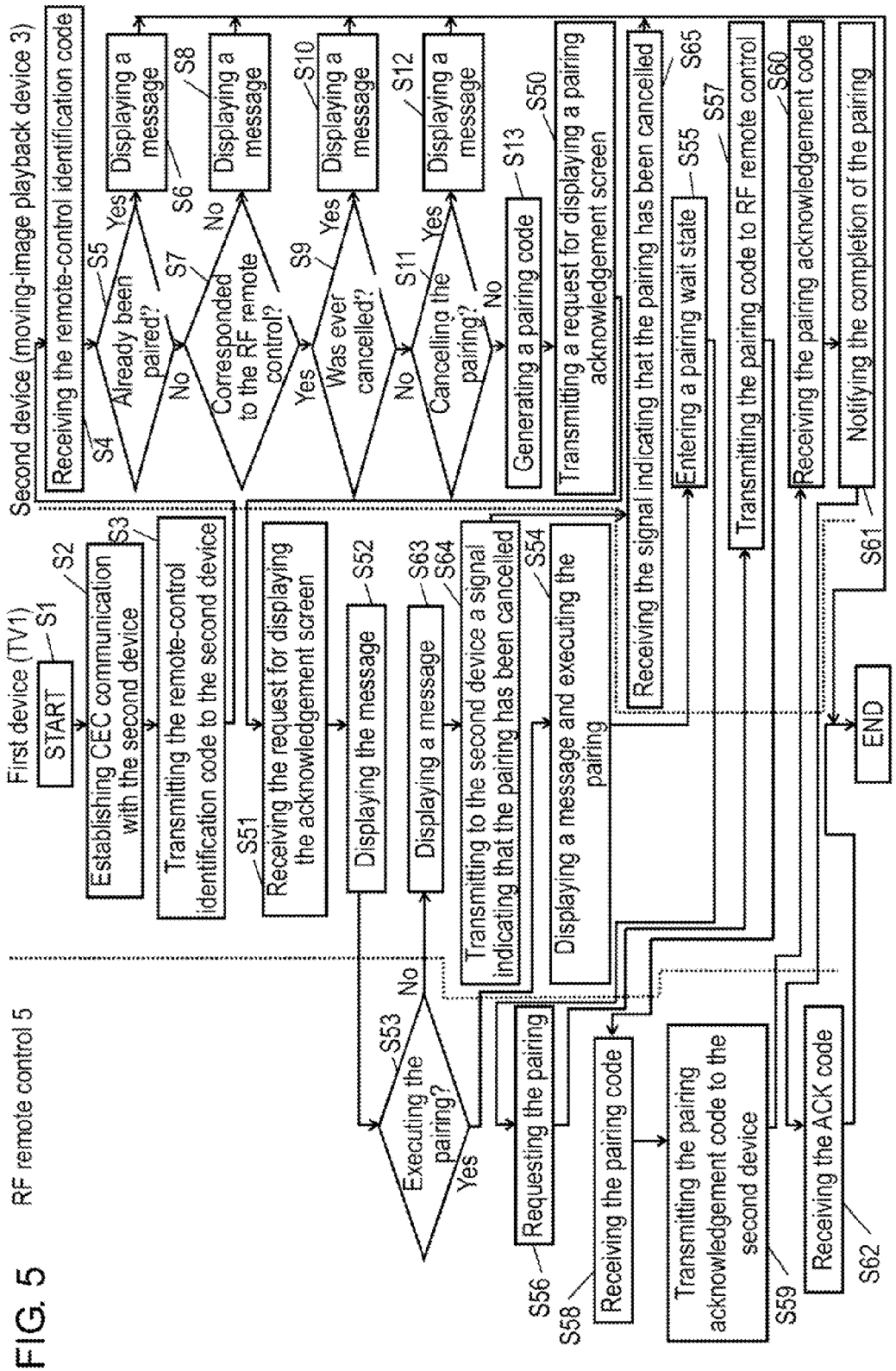
FIG. 5 is a flowchart showing how a moving-image playback device and an RF remote control are paired with each other without using a TV in a remote control system according to a third exemplary embodiment of the present invention.

FIG. 5 is a flowchart showing how moving-image playback device 3 and RF remote control 5 are paired with each other without using TV 1 in a remote control system according to the third exemplary embodiment.

The remote control system of the present exemplary embodiment has a structure similar to that of the remote control system of the first exemplary embodiment shown in FIG. 1, and hence the description thereof will be omitted. Steps S1 to S13 in the present exemplary embodiment are identical to those in the first exemplary embodiment, and hence the description thereof will be omitted.

Body control unit 34 transmits a pairing acknowledgement request to TV 1 through HDMI control unit 36 and CEC communication unit 37 (Step S50). The pairing acknowledgement request is a signal requesting TV 1 to display a message asking the user whether or not to execute a pairing between RF remote control 5 and moving-image playback device 3.

In TV 1, CEC communication unit 17 receives the signal from moving-image playback device 3, and transmits the signal to body control unit 14 through HDMI control unit 16 (Step S51). Body control unit 14 controls image display unit 10 to display the message asking the user whether or not to execute the pairing between RF remote control 5 and moving-image playback device 3 based on the information indicating the request to display the message, which is contained in the signal (Step S52). RF remote control 5 waits for a user operation to execute the pairing (Step S53).

The operations in Steps S50, S51, and S52 may alternatively be as follows. Moving-image playback device 3 makes a request to TV 1 so that body control unit 14 controls image display unit 10 to display the acknowledgement message using the OSD of TV 1, and upon this request, TV 1 displays the acknowledgement message. Alternatively, moving-image playback device 3 transmits image data containing the acknowledgement message to TV 1 via HDMI so that TV 1 displays the image data on image display unit 10, and upon this request, TV 1 displays the image (acknowledgement message) based on the image data.

One specific example of the message is "Press button 1 of the RF remote control to perform a pairing or press button 9 not to perform a pairing" as in Step S30 of the second exemplary embodiment.

When RF remote control 5 receives a user operation to execute a pairing in Step S53, RF remote-control control unit 51 transmits a signal to this effect to TV 1 through RF signal transceiving unit 52. In this case, as in the second exemplary embodiment, the signal transmitted from RF remote control 5 to TV 1 can be a signal indicating that button 1 has been pressed or that button 9 has been pressed, and is not a unique signal generated by RF remote control 5 to indicate the execution or cancellation of the pairing.

In TV 1, upon receiving the signal from RF remote control 5, RF signal transceiving unit 22 transfers the signal to body control unit 14 through RF remote-control control unit 21. Body control unit 14 confirms that the received signal indicates the execution of the pairing (in the above example, button 1 in RF remote control 5 has been pressed). Body control unit 14 then controls image display unit 10 to display a message urging the user to perform a predetermined user operation to generate a pairing request code for requesting the execution of the pairing. Body control unit 14 further transmits a signal indicating that the execution of the pairing has been selected to moving-image playback device 3 through HDMI control unit 16 and CEC communication unit 17 (Step S54).

Similar to Step S32 in the second exemplary embodiment, the predetermined user operation is preferably an unusual button operation, such as "Press buttons 1 and 9 of the RF remote control at the same time" or "Press and hold button 1 of the RF remote control for three seconds" in order to prevent wrong operations.

In moving-image playback device 3, CEC communication unit 37 receives the signal from TV 1 via CEC communication, and transfers the signal to body control unit 34 through HDMI control unit 36. After confirming that the received signal contains information indicating the execution of the pairing has been selected, body control unit 34 enters a pairing wait state (Step S55). When body control unit 34 is in the pairing wait state, moving-image playback device 3 receives the signal from RF remote control 5 as long as the signal contains both the pairing request code and the ID code of RF remote control 5, which is contained in the remote-control identification code received from TV 1 in Step S3, even if the signal does not contain the ID code of moving-image playback device 3.

When RF remote control 5 receives a predetermined user operation to generate the pairing request code, RF remote-control control unit 51 transmits a signal to this effect, namely a signal containing the pairing request code to moving-image playback device 3 through RF signal transceiving unit 52 (Step S56). The signal transmitted from RF remote control 5 to moving-image playback device 3 is a special signal to request the execution of the pairing. The signal is generated, as in the second exemplary embodiment, for example, only when button 1 is pressed and held for three seconds, or when buttons 1 and 9 are pressed at the same time.

This signal contains not the ID code of moving-image playback device 3, but the ID code of RF remote control 5. Therefore, in moving-image playback device 3, upon receiving the signal from RF remote control 5, RF signal transceiving unit 42 transfers the signal to body control unit 34 through RF remote-control control unit 41. Body control unit 34 confirms that the received signal contains the pairing request code (in the above example, the signal is generated only when button 1 is pressed and held for three seconds, or when buttons 1 and 9 are pressed at the same time). Unit 34 then makes a request for a pairing code, which is required for the pairing with RF remote control 5, to RF remote-control control unit 41. Upon this request, RF remote-control control unit 41 generates a pairing code. RF remote-control control unit 41 transmits the pairing code to RF remote control 5 through RF signal transceiving unit 42 as a fourth step (Step S57).

In RF remote control 5, RF signal transceiving unit 52 receives the pairing code from moving-image playback device 3, and delivers the code to RF remote-control control unit 51. RF remote-control control unit 51 receives and records the pairing code in registration data storage unit 53 (Step S58). The pairing code contains the ID data of moving-image playback device 3, and, consequently, this ID data is recorded in registration data storage unit 53.

RF remote-control control unit 51 generates a pairing acknowledgement code indicating successful receipt of the pairing code generated by moving-image playback device 3, and transmits the pairing acknowledgement code to moving-image playback device 3 through RF signal transceiving unit 52 (Step S59).

In moving-image playback device 3, RF signal transceiving unit 42 receives the pairing acknowledgement code from RF remote control 5, and delivers the code to RF remote-control control unit 41 (Step S60). RF remote-control control unit 41 receives the pairing acknowledgement code. After confirming the completion of the pairing with RF remote control 5, unit 41 transmits an ACK code indicating the completion of the pairing to RF remote control 5 through RF signal transceiving unit 42 (Step S61). RF remote control 5 receives the ACK code (Step S62), thus bringing the pairing to an end. In this case, TV 1 may display a message on image display unit 10, indicating the completion of the pairing between moving-image playback device 3 and RF remote control 5.

When RF remote control 5 receives a user operation to cancel the pairing in Step S53, RF remote-control control unit 51 transmits a signal to this effect to TV 1 through RF signal transceiving unit 52. In TV 1, upon receiving the signal, RF signal transceiving unit 22 transfers the signal to body control unit 14 through RF remote-control control unit 21. Body control unit 14 confirms that the received signal indicates the user's intention to cancel the pairing, and then controls image display unit 10 to display a message indicating that the pairing between RF remote control 5 and moving-image playback device 3 has been cancelled (Step S63). Body control unit 14 then transmits, to moving-image playback device 3 through HDMI control unit 16 and CEC communication unit 17, a signal indicating that the pairing has been cancelled (Step S64).

In moving-image playback device 3, CEC communication unit 37 receives, from TV 1 via CEC communication, the signal indicating that the pairing has been cancelled, and transfers the signal to body control unit 34 through HDMI control unit 36. Body control unit 34 confirms that the received signal contains information indicating that the pairing has been cancelled. Unit 34 then controls RF remote-control control unit 41 to record the information in registration data storage unit 43 (Step S65), thus bringing the pairing to an end.

In the present exemplary embodiment, RF remote control 5 and moving-image playback device 3 as the second device are paired with each other without using TV 1 as the first device, unlike in the first and second exemplary embodiments. Therefore, the second step (Step S14) and the third step (Step S16 in the first exemplary embodiment, and S34 in the second exemplary embodiment) are replaced by the fourth step (Step S57) in the present exemplary embodiment.

As described hereinbefore, in the present exemplary embodiment, unlike in the first and second exemplary embodiments, RF remote control 5 and moving-image playback device 3 as the second device are paired with each other without using TV 1 as the first device. In the same manner as in the second exemplary embodiment, RF remote control 5 can be in the OFF state until it receives the user operation in Step S53, thus reducing its power consumption. Thus, the user can easily pair RF remote control 5 and the second device, while reducing the power consumption of RF remote control 5.

In the first to third exemplary embodiments, TV 1 and moving-image playback device 3 are connected via HDMI-CEC shown in FIG. 1. Alternatively, it is possible to connect moving-image playback device 3 to an HDMI-CEC-compliant third device (not shown) via daisy chain, and to connect the third device to TV 1 via HDMI-CEC by way of moving-image playback device 3. In this case, the third device and TV 1 can transmit and receive CEC signals to/from each other.

In the first to third exemplary embodiments, TV 1 and moving-image playback device 3 are connected through HDMI-CEC-compliant HDMI cable 6 as shown in FIG. 1. Alternatively, however, TV 1 and moving-image playback device 3 may be connected wirelessly if both can transmit and receive HDMI-CEC-compliant radio signals.

In the first to third exemplary embodiments, Step S10 may be replaced by a step of asking the user whether or not to execute a pairing, and determining whether to continue or to cancel based on the result.

In the first exemplary embodiment, it is possible to omit Step S11 of cancelling the pairing and Step S12 of displaying the message, and instead to pair RF remote control 5 with moving-image playback device 3 without being informed to the user.

In the second exemplary embodiment, it is possible to partially omit Steps S31 and S32 by displaying a message on image display unit 10 in Step S30. The message allows the user to select between the predetermined user operation to generate the pairing request code and the user operation to cancel the pairing. One specific example of the message is "Press buttons 1 and 9 of the RF remote control at the same time to perform a pairing, or press button 5 not to perform a pairing".

In the third exemplary embodiment, the operations in Steps S50, S51, and S52 may alternatively be as follows. Moving-image playback device 3 makes a request to TV 1 so that body control unit 14 controls image display unit 10 to display the acknowledgement message using the OSD of TV 1, and upon this request, TV 1 displays the acknowledgement message. Alternatively, moving-image playback device 3 transmits image data containing the acknowledgement message to TV 1 via HDMI so that TV 1 displays the image data on image display unit 10, and upon this request, TV 1 displays the image (this message) based on the image data. One specific example of the message is "Press button 1 of the RF remote control to perform a pairing or press button 9 not to perform a pairing" as in Step S30 of the second exemplary embodiment.

In the first to third exemplary embodiments, the first device is TV 1, and the second device is moving-image playback device 3. Alternatively, however, the first device may be a device other than TV 1, and the second device may be a device other than moving-image playback device 3.

INDUSTRIAL APPLICABILITY

According to the present invention, when an RF remote control is paired with a first device, and the first device is connected to a second device via HDMI-CEC, the RF remote control and the second device can be paired by an easy user operation. The present invention is therefore useful as a remote control system, a television receiver, and a pairing method.

REFERENCE MARKS IN THE DRAWINGS

1 TV (television receiver)
2, 4 HDMI connector
3 moving-image playback device
5 RF remote control (radio frequency remote control)
6 HDMI cable
10 image display unit (display unit)
11 panel
12 panel driving unit
13, 33 signal processing unit
14, 34 body control unit
15, 35 HDMI connection unit
16, 36 HDMI control unit
17, 37 CEC communication unit
18 HDMI reception unit
20, 40 RF remote control response unit
21, 41, 51 RF remote-control control unit
22, 42, 52 RF signal transceiving unit
23, 43, 53 registration data storage unit
30 video record/playback unit
31 recording unit
32 record control unit
38 HDMI transmission unit
50 operation reception unit

The invention claimed is:
1. A television receiver comprising:
a display unit;
a body control unit;

a remote control response unit transmitting and receiving radio waves to and from a remote control having been paired with the television receiver; and a connection unit capable of being connected to another device, wherein the body control unit transmits an identification code of the remote control to a second device connected to the connection unit through the connection unit, wherein the body control unit receives a pairing code containing the identification code of the second device from the second device through the connection unit, and then displays a message on the display unit, the message asking a user whether or not to execute a pairing between the remote control and the second device, wherein when receiving a pairing request code for requesting execution of a pairing from the remote control through the remote control response unit, the body control unit transmits the pairing code to the remote control through the remote control response unit, and wherein when receiving an instruction to cancel the pairing from the remote control through the RF remote control response unit, the body control unit transmits a signal to the second device through the connection unit, the signal indicating that the pairing between the remote control and the second device has been cancelled.

2. A television receiver comprising:

a display unit;

a body control unit;

a remote control response unit transmitting and receiving radio waves to and from a remote control having been paired with the television receiver; and a connection unit capable of being connected to another device, wherein the body control unit transmits an identification code of the remote control to a second device connected to the connection unit through the connection unit, wherein after receiving a pairing acknowledgement request from the second device through the connection unit, the pairing acknowledgement request asking a user whether or not to execute a pairing between the remote control and the second device, the body control unit controls the display unit to display a message asking the user whether or not to execute the pairing between the remote control and the second device, wherein when receiving a signal to execute the pairing from the remote control through the remote control response unit, the body control unit transmits a signal to the second device through the connection unit, the signal indicating the execution of the pairing between the remote control and the second device, and controls the display unit to display a message urging the user to perform a predetermined user operation to generate a pairing request code for requesting the execution of the pairing, and wherein when receiving a signal to cancel the pairing from the remote control through the remote control response unit, the body control unit transmits a signal to cancel the pairing between the remote control and the second device to the second device through the connection unit.

* * * * *